United States Patent [19]
McCarron, III et al.

[11] Patent Number: 6,022,621
[45] Date of Patent: Feb. 8, 2000

[54] MULLITE-CONTAINING COATINGS FOR INORGANIC FIBERS AND CERAMIC MATRIX COMPOSITES

[75] Inventors: Eugene Michael McCarron, III, Greenville; Mark Andrew Harmer; Sujata Jagota, both of Wilmington, all of Del.

[73] Assignee: E. I. du Pont de Nemours and Company, Wilmington, Del.

[21] Appl. No.: 08/981,111

[22] PCT Filed: Jun. 19, 1996

[86] PCT No.: PCT/US96/10625

§ 371 Date: Dec. 17, 1997

§ 102(e) Date: Dec. 17, 1997

[87] PCT Pub. No.: WO97/00838

PCT Pub. Date: Jan. 9, 1997

Related U.S. Application Data

[60] Provisional application No. 60/000,688, Jun. 21, 1995.

[51] Int. Cl.[7] .................................................. C04B 35/628
[52] U.S. Cl. .................. 428/379; 427/372.2; 427/376.1; 427/376.2; 427/419.1; 427/419.2; 427/419.3; 427/434.2; 427/454.6; 427/443.2; 428/375; 428/378; 428/432; 428/697; 428/698; 428/704
[58] Field of Search .................................... 428/367, 697, 428/698, 104, 375, 378, 379, 432; 501/95.1, 141; 427/372.2, 376.1, 376.2, 419.1, 419.2, 419.3, 434.2, 434.6, 443.2

[56] References Cited

U.S. PATENT DOCUMENTS

| | | | |
|---|---|---|---|
| 4,543,345 | 9/1985 | Wei | 501/95 |
| 4,642,271 | 2/1987 | Rice | 428/698 |
| 4,806,428 | 2/1989 | Cooper et al. | 428/357 |
| 4,935,387 | 6/1990 | Beall et al. | 428/698 |
| 5,164,229 | 11/1992 | Hay | 427/372.2 |
| 5,227,199 | 7/1993 | Hazlebeck et al. | 427/376.2 |
| 5,652,188 | 7/1997 | Chyung et al. | 501/88 |

FOREIGN PATENT DOCUMENTS

| | | |
|---|---|---|
| 0 288 070 | 10/1988 | European Pat. Off. . |
| 0 366 234 | 5/1990 | European Pat. Off. . |
| 62-271223 | 10/1987 | Japan . |

OTHER PUBLICATIONS

Derwent Publications Ltd., London, GB; AN 79–75925B & JP 54 113 609 (Toshiba Monoflux), Sep. 5, 1979.

Clegg, W. J. et al., "A Simple Way to Make Tough Ceramics", *Nature*, 347, pp. 455–457, Oct. 1990.

Evans, A. G., "Perspective on the Development of High–Toughness Ceramics", *J. Am. Cerm. Soc.*, 73 [2], pp. 187–206, (1990) (No Month).

*Primary Examiner*—Archene Turner

[57] ABSTRACT

A ceramic matrix composite article comprised of inorganic fibers having a mullite-containing coating disposed within a matrix phase. The invention also provides a method for mating such an article, as well as for preparing a fiber having a mullite-containing coating. The mullite-containing coating on inorganic fibers within a matrix acts as a debonding coating, and the ceramic matrix composite article exhibits high strength and fracture toughness, even at elevated temperatures.

24 Claims, 6 Drawing Sheets

MULLITE-CONTAINING COATINGS FOR INORGANIC FIBERS AND CERAMIC MATRIX COMPOSITES

CROSS-REFERENCE TO RELATED APPLICATIONS

This application claims the benefit of U.S. Provisional Application 60/000,688, filed Jun. 21, 1995 and PCT International Application PCT/US96/10625, filed Jun. 19, 1996, wherein the United States was a designated country.

FIELD OF THE INVENTION

The invention generally relates to composite articles. In particular, the invention relates to inorganic fibers having a mullite-containing coating and to ceramic matrix composite articles reinforced with said fibers.

BACKGROUND OF THE INVENTION

Fiber-reinforced ceramic matrix composites comprising glass-ceramic matrices are known in the art. Fiber-reinforced ceramic matrix composites are useful as structural elements in high temperature environments such as heat engines. For these and other applications, the materials to be employed must exhibit good strength and toughness at ambient as well as elevated temperatures.

An important problem which has been identified in silicon carbide fiber reinforced ceramic matrix composites, particularly after exposure to temperatures above about 800° C. in an oxidizing environment, is that microcracks can form causing embrittlement. Instead of exhibiting increased toughness and strength after exposure to high temperatures, the materials become brittle and are subject to catastrophic breakage, rather than more gradual failure as is typical of the original material. These physical problems can be attributed, in-part, to the effect of the interface between the silicon carbide fibers and the ceramic matrix composite.

Physical testing of ceramic matrix composites, embrittled during or subsequent to high temperature exposure, shows decreases in fracture toughness through changes in the fracture properties of the material, leading to a degradation of the material. Thus, the predominant fracture mode changes from one characterized by fiber pullout from the matrix to one wherein woody fracture, or ultimately, brittle fracture occurs. Woody fracture surfaces display some crack propagation parallel to the stress axis, indicating localized shear failure without fibrous pullout, while brittle fracture surfaces display merely planar fracture surfaces as the composite exhibits no plastic deformation.

The onset of brittle fracture behavior in these composites typically occurs in conjunction with significant reductions in fracture toughness. One indicator of this reduced toughness is a drop in the extent of strain of sample elongation observed above the so-called microcrack stress point of the material. Among the factors believed to influence fracture toughness are fiber debonding and fiber pullout behavior, including the degree of frictional resistance to fiber pullout from the matrix, as well as crack deflection occurring in the matrix and at the fiber-matrix interface. Modifications to the matrix or fiber reinforcement can significantly aid in the development of composites exhibiting good high temperature fracture toughness and strength.

It is known to provide coatings on reinforcement fibers to be incorporated in composite materials to modify the behavior of the materials therein. For example, boron nitride coatings have been applied to silicon carbide fibers or other fibers that are subsequently incorporated in ceramic matrix materials such as $SiO_2$, $ZrO_2$, mullite and cordierite (see e.g., U.S. Pat. No. 4,642,271 (Rice)).

It is established that the interface between fibers and the matrix is critical to the mechanical properties of brittle-matrix composites. In particular, the debonding and frictional characteristics of the interface control the mode of fracture (multiple cracking vs. single crack), and mechanical properties such as fracture toughness. Desired interfacial properties are usually achieved by the incorporation of a coating between the fiber and matrix.

For example, Beall et al., European Patent Application Publication Number 366234 A1, disclose ceramic matrix composite articles comprising a ceramic, glass-ceramic or glass matrix and a fiber reinforcement phase disposed within the matrix. The fiber reinforcement phase consists of amorphous or crystalline inorganic fibers, wherein there is provided, on or in close proximity to the surfaces of the inorganic fibers, a layer of sheet silicate crystals. The layer of sheet silicate crystals are used to improve fiber pullout behavior and to improve toughness retention at elevated temperatures.

At present, however, there are only a few other successful coating materials, most notably, carbon, although some success has been reported with metallic and porous coatings. In most of the composite systems that have been studied to date, exposure of the coating to high temperatures in air seriously degrades its properties. For example, in the case of lithium aluminum silicate matrix reinforced with carbon-coated silicon carbide fibers, heat treatment in air leads to a strong $SiO_2$ interface, and the material loses its quasi-brittle mechanical properties. There is therefore great interest in developing alternative coatings for fibers in brittle-matrix composites.

Oxides are a class of materials which have intrinsic high temperature stability in air. A particular interest has been to look at using oxidation resistant materials as potential fiber coatings in ceramic matrix composites for high temperature/high stress applications. An important consideration in choosing an interfacial material is its ability to form uniform coatings on the fibers in question.

Clearly, coating materials having excellent film-forming capability, and which can be coated successfully onto fibers such as SiC and borosilicate glass fibers, are needed. Such materials need to provide debonding coatings on the surfaces of fibers used in ceramic matrix composites, wherein such coatings remain stable at elevated temperatures. Moreover, such ceramic matrix composites need to have high strength and fracture toughness, even at elevated temperatures. As a result, it is an object of the present invention to provide coatings for fibers and ceramic matrix composites that overcome the problems and deficiencies of the prior art. Other objects and advantages of the present invention will become apparent to those skilled in the art upon reference to the attached drawings and to the detailed description of the invention which hereinafter follows.

SUMMARY OF THE INVENTION

The invention provides for an improved ceramic matrix composite article comprising:
  (a) a matrix phase comprised of a ceramic material selected from the group consisting of crystalline ceramics, glass ceramics, glasses, and combinations thereof; and
  (b) a fiber reinforcement phase comprised of a plurality of amorphous or crystalline inorganic fibers disposed within the matrix phase, wherein the improvement comprises the inorganic fibers having a mullite-containing coating on the surface of said inorganic fibers and wherein the inorganic fibers are not comprised of a mullite-precursor.

The invention also provides for a method of coating an inorganic fiber with a mullite-containing coating, comprising the steps of:

(a) modifying a smectite clay by ion-exchange in solution to provide sufficient amounts of aluminum ions in the clay;

(b) adding a pillared smectite clay to the solution to form a suspension;

(c) drawing an inorganic fiber through the suspension of step (b) and drying the fiber thereafter;

(d) repeating step (c) a plurality of times until the desired amount of coating is deposited on the surface of the fiber; and (f) heating the coated fiber to a temperature sufficient to convert the clay coating to a coating containing mullite. Optionally, excess salts may be removed after step (b) and before step (c).

The above procedure can be modified slightly to provide for making a ceramic matrix composite article. In this modified process, prior to step (f), the following step can be incorporated:

(e) combining a plurality of coated fibers with a matrix phase comprised of a ceramic material selected from the group consisting of crystalline ceramics, glass-ceramics, glasses and combinations thereof, to form a ceramic matrix composite such that the plurality of coated fibers are disposed within the matrix phase.

The invention also provides an amorphous or crystalline inorganic fiber having a mullite-containing coating wherein the inorganic fiber is not a mullite precursor.

DETAILED DESCRIPTION OF THE PREFERRED EMBODIMENTS

Figure 1A:
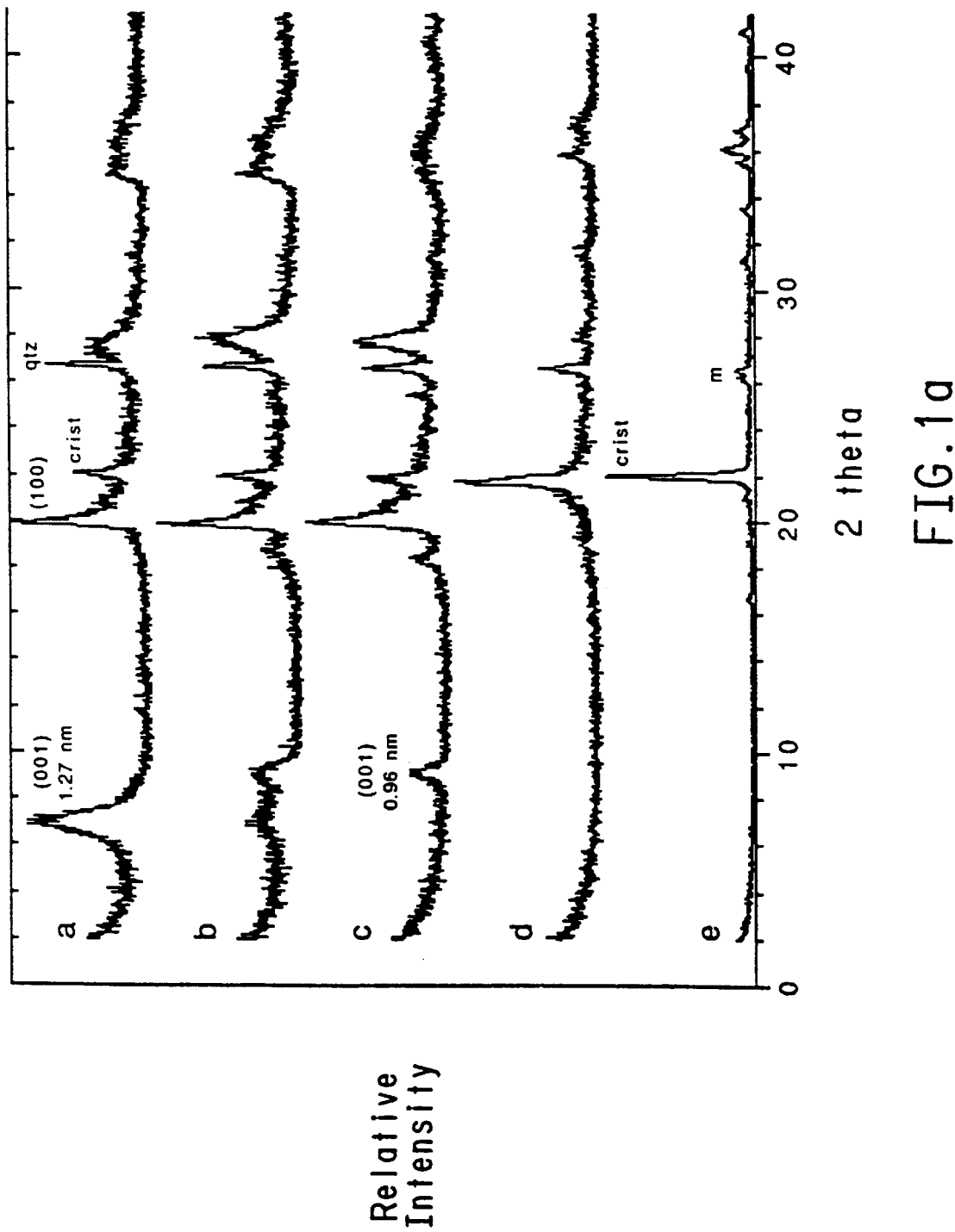
FIG. 1(a) shows room temperature x-ray diffraction data for bentonite and FIG. 1(b) shows comparative room temperature x-ray diffraction data for Al-bentonite clays, both as a function of thermal treatment: (a) and (f) are at room temperature; (b) and (g) are after heating to 500° C.; (c) and (h) are after heating to 800° C.; (d) and (i) are after heating to 1000° C.; and (e) and (j) are after heating to 1200° C.

The invention provides for novel ceramic matrix composites, comprising a matrix phase and a fiber reinforcement phase wherein the fibers have a mullite-containing coating on their surfaces. Novel inorganic fibers having a mullite-containing coating are also provided.

The invention further provides for a novel process for the low-temperature formation of mullite-containing coatings, from pillared smectite clay precursors, on fibers, for use in ceramic matrix composites (CMC's). Smectite clay precursors display excellent film-forming capability and can be uniformly coated onto inorganic fibers. Mechanical tests on composites of such coated fibers in a glass matrix demonstrate the fibers are successful as debondable coatings. In particular, alumina-pillared bentonite can be converted substantially to mullite at the unusually low temperature of about 800° C.

One embodiment of the invention involves a ceramic matrix composite article. As is known in the art, composites typically comprise a matrix phase and a fiber reinforcement phase. The fiber reinforcement phase is typically combined with, and hence disposed within, the matrix phase, the two phases then being heated to form a composite article.

The improvement lies in the fact that the inorganic fibers in the fiber reinforcement phase have a mullite-containing coating on their surface, thus forming an interfacial layer between the fibers and the matrix. In composites, these coated fibers show debonding characteristics, as well as evidence of being tough materials, i.e., multiple matrix cracking and non-linear stress-strain response prior to peak stress. Additionally, since mullite is an oxide, stability at elevated temperatures is achieved.

As used herein, "mullite-containing coating" means a coating that comprises between about 1–100 wt. % mullite (i.e., an orthorhombic silicate of aluminum, $Al_6Si_2O_{13}$ or $3Al_2O_3 \cdot 2SiO_2$), although other phases may be present. Preferably, the coating is at least about 40 wt. % mullite.

The matrix phase can comprise a ceramic material selected from crystalline ceramics, glass-ceramics, glasses and combinations thereof. This can include borosilicate glasses, aluminosilicate glasses, lithium aluminosilicate glasses, and alkaline earth aluminosilicate glasses, silicon carbide, boron nitride, silicon oxynitride and silicon nitride.

The fiber reinforcement phase comprises amorphous or crystalline inorganic fibers having a mullite-containing coating on their surfaces. Useful inorganic fibers include fibers having one of the following compositions: silicon carbide, boron nitride, silicon oxycarbide, carbon, alumina, boron carbide, zircon, spinel, silicon nitride, silicon oxynitride, titanium carbide, and titanium diboride.

A proportion of at least about 1% fiber reinforcement by volume is preferred to be included in the ceramic matrix composite of the invention herein. Most preferably, the percentage of fibers by volume should be in the range of about 30 to 80%. The fibers may vary in size and shape, since this aspect is not considered critical to the invention.

Layered aluminosilicate oxides have been found to be good film-formers which can be subsequently thermally, and in some cases, chemically altered to give new coatings with interesting properties, such as a mullite-containing coating. Pillared smectite clays are used as precursor materials, which can be coated onto inorganic fibers. Being inexpensive and excellent film-formers, these clays show promise as fiber coatings for brittle-matrix composites. Being oxides, they provide enhanced stability at elevated temperatures.

Figure 2A:
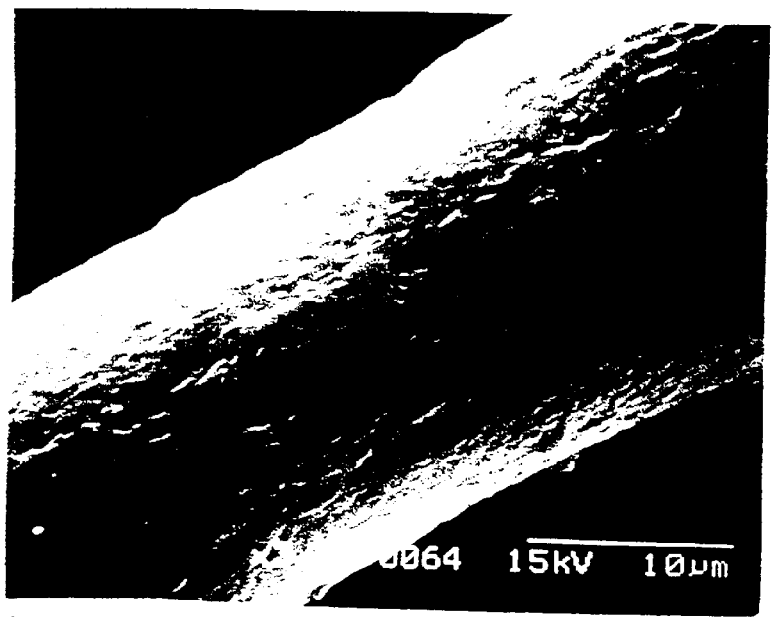
FIG. 2(a) is a SEM micrograph of a SiC fiber with a bentonite clay coating.

An important feature of these clay-based materials is the ease with which thin films can be formed. FIG. 2(a) shows a SiC fiber which has been coated with a bentonite clay. The coating is seen to be uniform after three dips and calcination at 500° C. The clay suspension in water has good film-forming properties as compared to analogous sol-gel derived suspensions where excessive cracking occurs upon drying. Drawing SiC fibers through an ion exchanged-bentonite suspension readily coats the fiber to uniform thicknesses of 50–250 nm, and the process can be repeated to build-up coatings of different thicknesses.

Figure 2B:
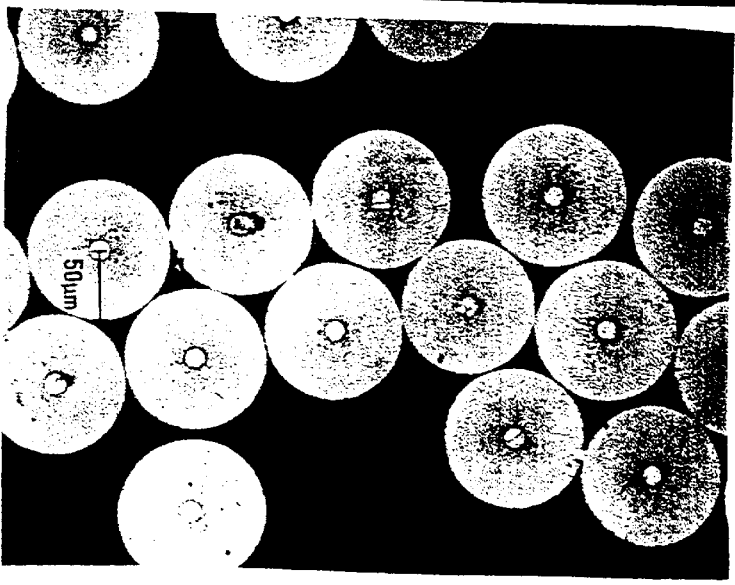
FIG. 2(b) is an optical micrograph of a cross-section of the glass/SiC composite.
Figure 2C:
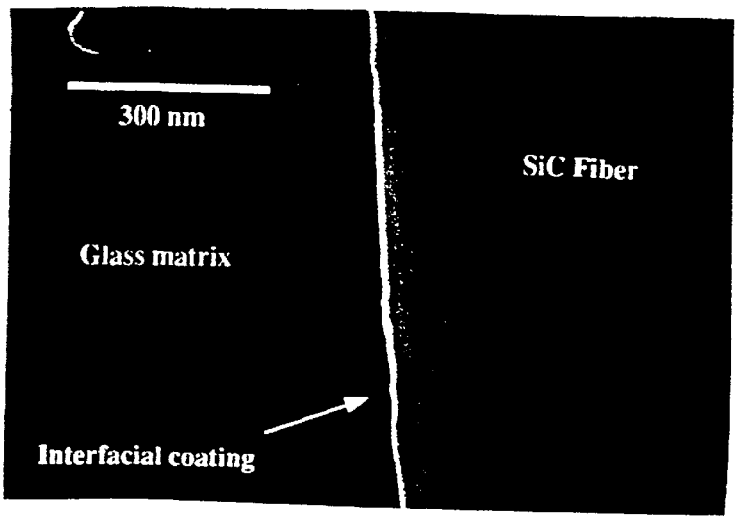
FIG. 2(c) is a SEM micrograph of the interfacial coating between the glass and SiC fiber (single dip).

FIG. 2(b) shows a transverse section of a composite specimen, hot-pressed at 900° C. FIG. 2(c) shows the thin interfacial coating (approximately 30 nm). The presence of the coating was confirmed by energy dispersive x-ray analysis (EDX), which showed aluminum at the edge of the fiber.

Figure 1B:
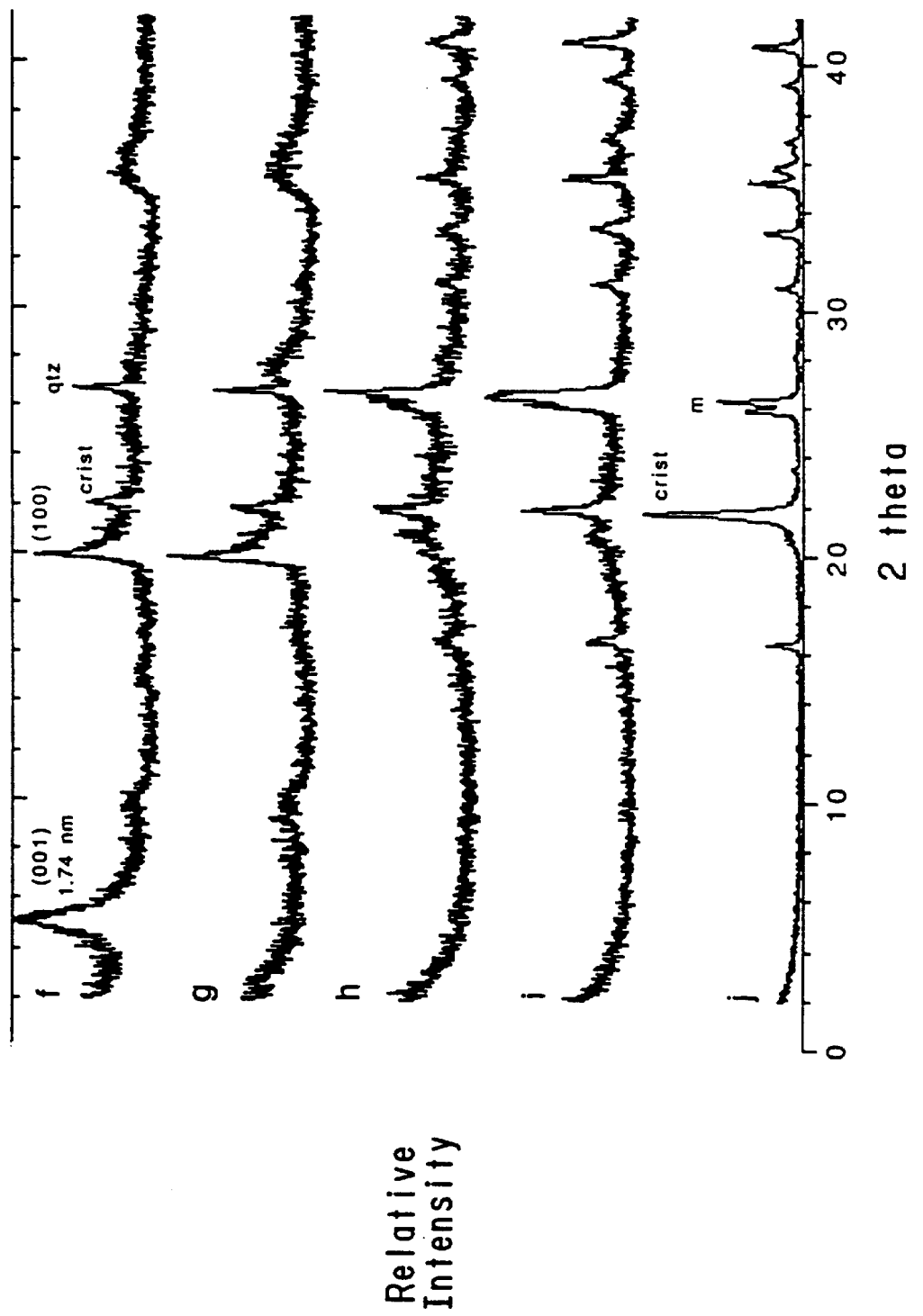

Montmorillonite (ideally, $[Na_{0.33} \cdot xH_2O]^{1/3+}$ $[(Al_{1.67}Mg_{0.33})Si_4O_{10}(OH)_2]^{1/3-}$) is a preferred smectite clay which consists of hydrated ions charge compensating for and sandwiched between partially substituted 1:2::Al:Si aluminosilicate layers. Bentonite is a naturally occurring montmorillonite-related mineral. FIGS. 1(a) and 1(b) compare the structural evolution of bentonite and $[Al_{13}O_4(OH)_{24}(H_2O)_{12}]^{7+}$-exchanged bentonite as a function of thermal treatment, see Example 1.

As provided for in the process embodiment of the invention, clay-based precursors are used to form oxide coatings on inorganic fibers. The alumina-pillared bentonite clay which is coated on the inorganic fiber can be transformed to mullite at temperatures as low as about 800° C. Thus, as noted before, the invention also provides for inorganic fibers having a mullite-containing coating on their surfaces.

Composites can be formed by combining the mullite-containing coated fibers with a matrix phase. Composites of fibers coated with a mullite-containing coating in a borosilicate glass show considerable debonding in indentation tests, and all the signatures of a tough material: multiple matrix cracking and a nonlinear stress-strain response prior to peak stress. Since the coefficient of thermal expansion of mullite is well-matched to that of SiC, a preferred matrix and inorganic fiber phase material is silicon carbide.

Figure 3A:
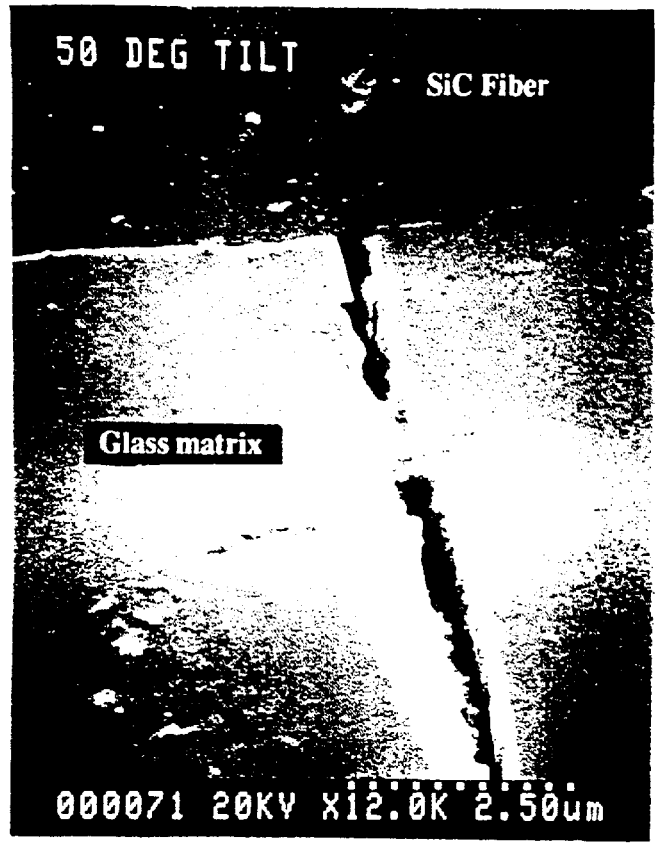
FIGS. 3(a) and 3(b) are SEM micrographs of the residual displacement of a fiber in a ceramic matrix composite after indentation of the fiber in the matrix (FIG. 3(a) uncoated and FIG. 3(b) coated).
Figure 3B:
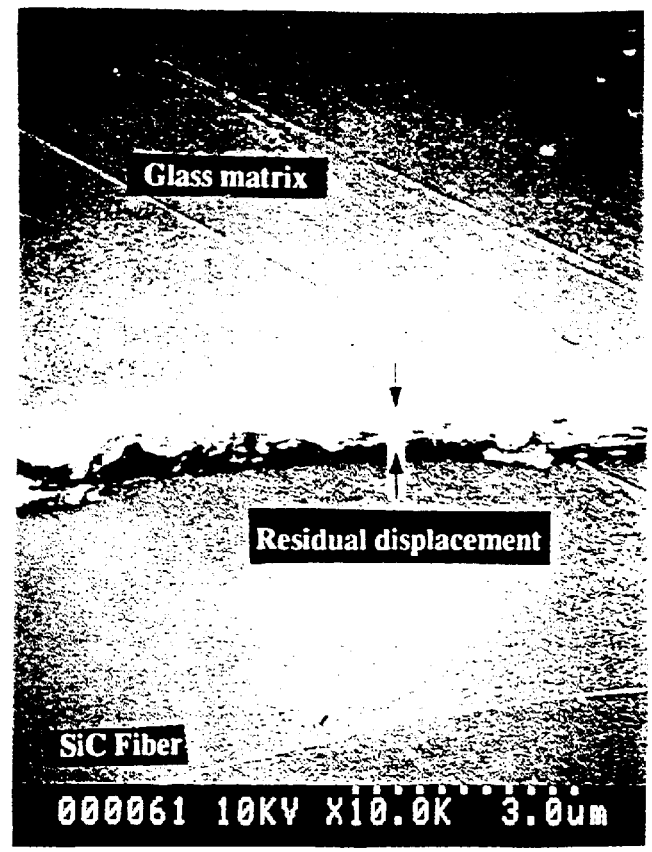

Hot-pressed composites of clay-coated SiC fibers with borosilicate glass have been fabricated and mechanical tests using single-fiber indentation and four-point bending of composite beams have been used to study the potential of such coatings as debonding interfaces. Indentation experiments conducted on composites with coated and uncoated fibers under loads in the range of 5–30 N showed residual displacement after indentation of an order of magnitude greater for the coated fibers compared to uncoated fibers (see Example 2). FIGS. 3(a) and 3(b) show SEMI micrographs of coated (3(b)) and uncoated (3(a)) fibers after indentation.

Another embodiment of this invention involves a method for making a ceramic matrix composite article. The first step of the method comprises modifying a smectite clay by ion-exchange to provide sufficient amounts of aluminum ions in the clay. This can be accomplished by forming a solution containing a soluble aluminum ion, preferably a polyoxo-aluminum Keggin ion, $([Al_{13}O_4(OH)_{24}(H_2O)_{12}]^{7+})$. Other cations or cationic clusters are contemplated, e.g., $Al^{3+}$, Ga based or Ga/Al based clusters. Thereafter, a pillared smectite clay, e.g., montmorillonite/bentonite, is added to the solution to form a suspension. The resulting $([Al_{13}O_4(OH)_{24}(H_2O)_{12}]^{7+})$-exchanged bentonite will be referred to as Al-bentonite, for purposes of this invention.

The next step in the method involves drawing an inorganic fiber through the suspension. By doing so, a coating of the suspension is deposited on the surface of the inorganic fiber. After coating, the fiber should be dried to solidify the coating. This is generally accomplished by heating the fiber, typically to a temperature ranging from about 150° C. to about 250° C. After drying, the inorganic fiber can be drawn through the suspension a number of additional times until the desired thickness of coating is achieved, making sure to dry the fiber as described above after each successive coating. The concentration of the smectite clay in the suspension may vary depending on the desired coating thickness on the fiber. Typical coating thickness will range from about 50 nm to about 250 nm.

The next step in the method involves combining a plurality of coated inorganic fibers with a matrix phase comprised of a ceramic material described hereinbefore. Combining the coated inorganic fibers with a matrix phase causes the coated fibers to be disposed within and throughout the matrix phase. Finally, the ceramic matrix composite is then heated to a temperature sufficient to convert the clay coating on the fibers to a coating containing mullite. The temperature is preferably at least about 800° C., and usually no higher than about 1700° C. The result is a ceramic matrix composite article wherein the inorganic fibers have a mullite-containing coating which acts as an interfacial layer between the fibers and the matrix, and thus serves as a debonding interface.

Prior to coating, the suspension can be optionally treated to remove excess salts. This is preferably done by dialyzing the suspension. The step of dialyzing typically comprises placing the suspension in a dialysis membrane (which can be purchased commercially from e.g., Spectrum Medical Industries, Inc. of Los Angeles, Calif.), and placing the membrane containing the suspension in excess dionized water, e.g., 2000 mL of deionized water for 100 mL of the suspension. The membrane should remain in the deionized water for a sufficient time to allow removal of the excess salts. The water is preferably stirred periodically and replaced after 24 hours.

Additionally, the optional step of removing excess salts can also be accomplished by filtering the suspension and then washing the collected filtrate with water.

Another embodiment of this invention involves a method for coating fibers with a mullite-containing coating. The method is similar to the method of forming a ceramic matrix composite article discussed above, but does not include the step of combining the coated fibers with a matrix phase. Instead, the coated fibers can be made and transported for later use in a ceramic matrix composite. After coating and drying the fibers, the fibers are heated to a temperature sufficient to convert the clay coating to a coating containing mullite, preferably at least about 800° C.

Fibers having a mullite-containing coating have not been found to fail catastrophically in a ceramic matrix, and the stress does not fall to zero in four-point bend tests. The failure occurs in steps, gradually, and the ceramic remains in tact. This is a significant improvement over non-coated fibers which fail catastrophically and the stress goes to zero in the same tests.

EXAMPLES

The following non-limiting inventive examples and comparative examples are presented to further illustrate the invention.

Comparative Example A

Fibers Coated With Bentonite Clay

Silicon carbide fibers, nominally 100 microns in diameter with a tungsten core (SCS fiber, Textron Specialty Materials, Lowell, Mass.), were coated with a naturally occurring bentonite clay (Volclay MBS-1, American Colloid Company) by drawing the fibers through an aqueous suspension of the clay. The fibers, as received, have a polyvinyl alcohol coating which was removed by feeding the fiber continuously through a furnace in air at 500° C. The fibers were then coated with the bentonite by feeding them directly from the furnace through a 1.5% (by weight) suspension of the clay. The fibers were dried at 200° C. and re-coated three times. Each dip gave a coating of about 0.03 microns, resulting in a final coating thickness of about 0.1 microns. FIG. 2(a) shows a micrograph from an Scanning Electron Microscope (SEM) of the SiC fiber with a bentonite clay coating showing the uniformity of the coating. The fibers were then subjected to temperatures up to 1200° C.

Samples of the bentonite clay were taken for x-ray diffraction after heating to temperatures of 500° C. (FIG. 1(a)-(b)), 800° C. (FIG. 1(a)-(c)), 1000° C. (FIG. 1(a)-(d)), and 1200° C. (FIG. 1(a)-(e)).

Example 1

Fibers Coated With Alumina Pillared Bentonite

Mullite-containing debondable coatings were prepared as follows: To a stirred aluminum trichloride (2.4 g of $AlCl_3 \cdot 6H_2O$ in 50 mL of water) solution, sodium hydroxide (40 mL of a 0.5 M NaOH solution) was added over about 1 hour to provide a final ratio of OH/Al of 2.0. The solution was stirred and heated to 60° C. for two hours. To this solution, 50 mL of a 2% by weight suspension of naturally occurring bentonite clay (Volclay MPS-1, American Colloid Company of Belle Fourche, S. Dak.) was added and the mixture was stirred for 24 hours. The resulting suspension was then dialyzed (Spectra/Por 3, Spectrum Medical Industries, Inc.) for 24 hours with de-ionized water to remove the excess salt formed. This suspension of a polyoxo-aluminum Keggin ion $[Al_{13}O_4(OH)_{24}(H_2O)_{12}]^{7+}$-exchanged bentonite (referred to as Al-bentonite) was used to coat fibers directly. For mechanical testing, silicon carbide fibers, nominally 100 microns in diameter with a tungsten core (SCS fiber, Textron Specialty Materials of Lowell, Mass.), were coated directly with the clay suspension. The fibers, as received, have a polyvinyl alcohol coating which was removed by feeding the fiber continuously through a furnace in air at 500° C. The fibers were then coated with the Al-bentonite by feeding them directly from the furnace through the suspension of the clay. The fiber was dried at 200° C. and re-coated three times. Each dip gave a coating of about 0.03 microns, resulting in a uniform coating (see FIG. 2(c)) having a final coating thickness of about 0.1 microns. The fibers were then subjected to temperatures up to 1200° C.

Samples of the alumina pillared bentonite were taken for x-ray diffraction after heating to temperatures of 500° C. (FIG. 1(b)-(g)), 800° C. (FIG. 1(b)-(h)), 1000° C. (FIG. 1(b)-(i)), and 1200° C. (FIG. 1(b)-(j)).

X-ray Diffraction Results

The distinction to be made between coating made of bentonite clay (COMPARATIVE EXAMPLE A) and those made of alumina-pillared bentonite clay (EXAMPLE 1) is revealed by powder x-ray diffraction as shown in FIGS. 1(a) and 1(b). The room-temperature x-ray diffraction pattern of bentonite clay (FIG. 1(a)-(a)) reveals a characteristic layer spacing of 1.27 nm. The presence of quartz and cristobalite impurities is also noted and acts conveniently as an internal standard. Upon heating the bentonite clay to 800° C. (FIGS. 1(a)-(b) and 1(a)-(c)), the basic structure of the aluminosilicate layers is maintained while the layer spacing decreases with loss of interlayer water to 0.96 nm. At 1000° C. (FIG. 1(a)-(d)) the layer structure collapses as evidenced by loss of the (100) peak and cristobalite forms (note the intensity change of the cristobalite peak relative to quartz). Presumably, the aluminum oxide-containing component of the clay is amorphous. Upon further heating to 1200° C. (FIG. 1(a)-(e)), mullite $Al_6Si_2O_{13}$ is formed and the excess silica which would be expected for a 1:2::Al:Si bentonite clay is converted completely to cristobalite.

In FIG. 1(a)-(f) the pattern of bentonite clay exchanged with $[Al_{13}O_4(OH)_{24}(H_2O)_{12}]^{7+}$ ions is shown. The increase in the layer spacing to 1.74 nm indicates that the Keggin ions are intercalated between the clay layers. The rest of the spectrum is similar to that of bentonite (FIG. 1(a)-(a)) with the invariant peaks presumably indexing as (hk0). Upon heating Al-bentonite to 500° C. (FIG. 1(b)-(g)), the layer peak disappears indicating a disorder in the stacking upon formation of alumina pillars between the sheets. However, the crystallinity within the Si-Al-Si oxide sheet is maintained, as evidenced by the continued presence of the (100) reflection. At 800° C., Al-bentonite forms mullite as shown in FIG. 1(b)-(h). As noted above, upon similar heat treatment of the unexchanged bentonite no evidence of mullite formation was observed (FIG. 1(a)-(c)). While this invention is not bound by any particular theory or observation, it is speculated that this observation is attributable to the intimate mixing at the atomic scale of the $[Al_{13}O_4(OH)_{24}(H_2O)_{12}]^{7+}$ Keggin ions with the Si-rich aluminosilicate clay layers. At higher temperatures (1000° and 1200° C.; FIGS. 1(b)-(i) and 1(b)-(j), respectively) the mullite pattern sharpens indicative of increasing crystallinity and, as in the pure bentonite case, excess silica converts to cristobalite. The increase in the amount of mullite formed compared to that in the case of pure bentonite (FIGS. 1(a)-(e) and 1(b)-(j)) is consistent with the increased aluminum content of the Al-bentonite sample.

Example 2

Composite Frabrication Using Coated Fibers

Composites of the coated fibers and a borosilicate glass (Corning Glass 7740 of Corning, N.Y.) were fabricated. Several samples with widely dispersed fibers were fabricated to be sectioned and prepared for indentation experiments. Other samples contained approximately 30% fibers (by volume); these were used for four-point bend tests. The composites were laid-up by hand in a 5 cm diameter graphite die (typically 14.0 g of glass to 3.0 g of SiC fiber). These were vacuum hot-pressed in 10 torr pressure at 900° C. for 15 minutes, cooled at 10° C./minute to 570° C., held at 570° C. for 30 minutes, and furnace-cooled to room temperature. A pressure of 13 Mpa was applied during hot-pressing at 900° C., and released during cooling. The hot-pressed samples were ejected from the graphite die at room temperature. Sections normal to the orientation of the fibers were cut and polished to a grit size of 1 micron for the indentation experiments. Samples for bend tests were cut, typically with dimensions of 45 mm×4 mm×1.5 mm.

Comparative Example 3

Composite Fabrication Using Uncoated Fibers

Composites of uncoated fibers and a borosilicate glass (Corning Glass 7740) were fabricated. Several samples with widely dispersed fibers were fabricated to be sectioned and prepared for indentation experiments. Other samples contained approximately 30% fibers (by volume); these were used for four-point bend tests. The composites were laid-up by hand in a 5 cm diameter graphite die (typically 14.0 g of glass to 3.0 g of SiC fiber). These were vacuum hot-pressed in 10 torr pressure at 900° C. for 15 minutes, cooled at 10° C./minute to 570° C., held at 570° C. for 30 minutes, and furnace-cooled to room temperature. A pressure of 13 MPa was applied during hot-pressing at 900° C., and released during cooling. The hot-pressed samples were ejected from the graphite die at room temperature. Sections normal to the orientation of the fibers were cut and polished to a grit size of 1 micron for indentation experiments. Samples for bend tests were cut, typically with dimensions of 45 mm×4 mm×1.5 mm.

For both coated and uncoated fibers, individual fibers were indented with a Vicker's diamond tip (Zwick 3212) with loads in the range of 5–30 N. The indentation caused the fibers to debond. The residual displacement after indentation was seen to be an order of magnitude greater for the coated fibers compared to the uncoated fibers. FIGS. 3(a) and 3(b) show SEM micrographs of coated and uncoated fibers after indentation. In all cases, the indentation spawned radial cracks. These, however, do not seriously affect the primary measurement from this experiment: the residual out-of-plane displacement of the fiber. Upon unloading, the residual displacement of the fiber with respect to the matrix, $u^r$, was used to estimate the frictional resistance of the interface. Its average value was 0.1±0.02 microns for the uncoated fibers and 1.0±0.3 microns for both the bentonite and Al-bentonite coated fibers. Using equation (1) (below), the sliding resistance t was estimated to be about 1.0 GPa for the uncoated fibers and 100 MPa for the coated fibers. The sliding resistance for the coated fibers is large compared to commonly measured values for carbon interfaces, but sufficiently low compared to the uncoated fibers to promote debonding at the interface in the bend tests described below.

The samples had a relatively small volume fraction of fibers (about 30%), and a glassy matrix was chosen for ease of processing, rather than as a candidate for ultimate use. It is contemplated that performance could be improved by increasing the volume fraction of the fibers, and/or by using different matrix materials.

The residual displacement was measured directly from scanning electron micrographs taken at known tilts, and by surface profile measurements. It is used to estimate the (assumed) constant shear t which resists sliding of the fiber-matrix interface. This allows a comparison of different coatings using a single parameter and a simple indentation test. Then, t can be estimated as:

$$t = F^2 / (8 \pi^2 R^3 u^r E^f) \qquad (1)$$

where F is the indentation load, R is the fiber radius, and $E^f$ is the Young's modulus of the fiber (=400 GPa). Four-point bend tests were conducted in air or in water using inner/outer spans of 10/40 or 20/40 mm, at a ram displacement rate of 25 mm/s.

Figure 4:
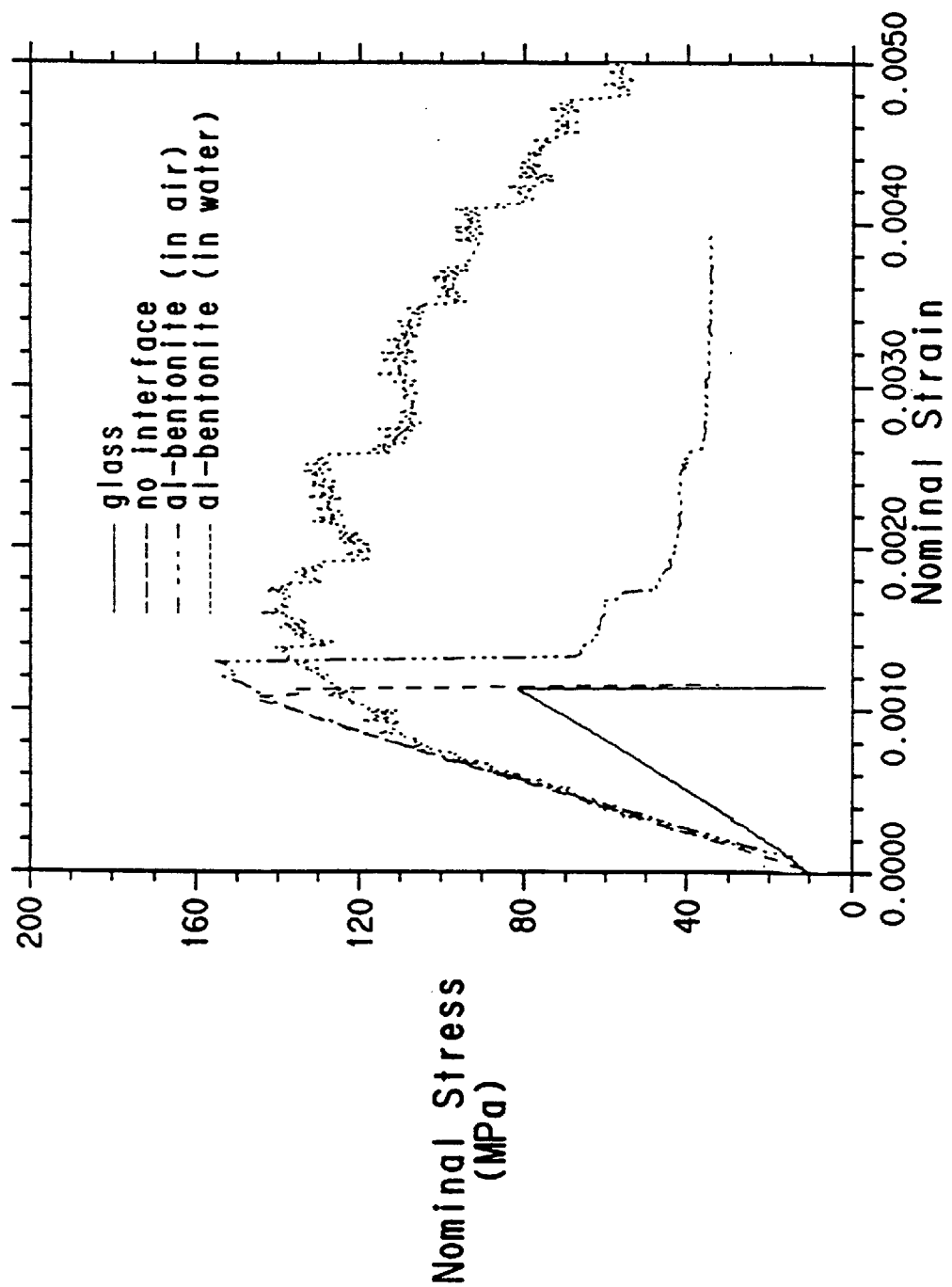
FIG. 4 shows typical results of four-point bend tests on four types of specimens: (1) glass matrix material; (2) glass matrix with uncoated fibers; (3) Al-bentonite (i.e., mullite) coated fibers in glass matrix tested in air; and (4) Al-bentonite coated fibers in glass matrix tested in water.

FIG. 4 shows typical results from four-point bend tests for four types of specimens: (1) glass matrix material; (2) glass matrix with uncoated fibers; (3) Al-bentonite coated, which is substantially mullite coated, fibers in glass matrix tested in air; and (4) Al-bentonite coated fibers in glass matrix tested in water. The measured force-displacement data were converted into stress and strain, based on a nominally undamaged material. The three composite specimens have a greater initial stiffness than the glass specimen due to the greater stiffness of the fibers. The glass and the composite without a coating both show brittle behavior. Failure for these specimens was from a single crack with little pull-out of fibers in the composite. The stress-strain behavior of the bentonite-coated composites (data not shown here) is similar to the uncoated composite samples.

Figure 5:
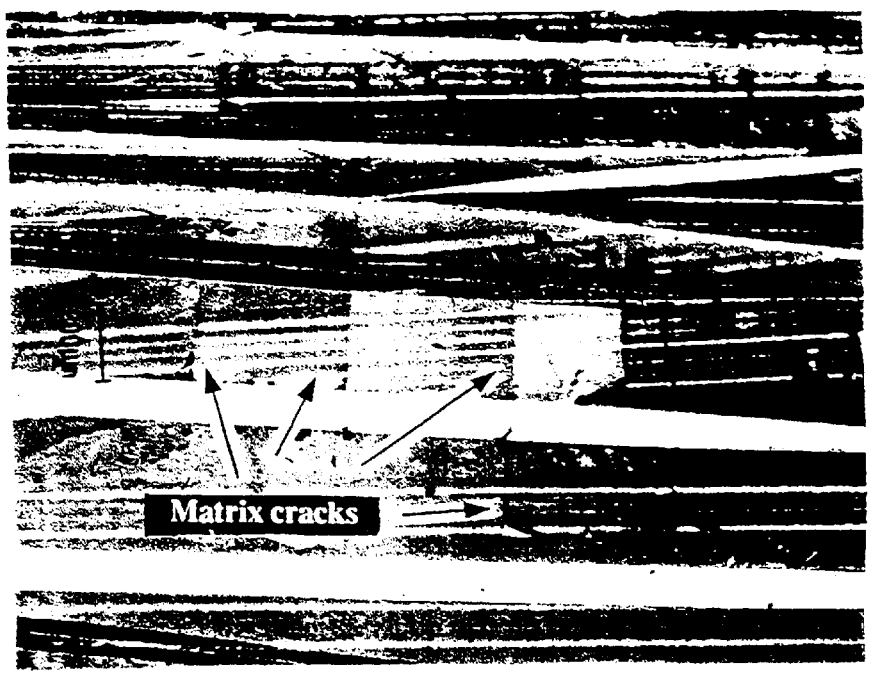
FIG. 5 is an SEM showing multiple matrix cracks in an Al-bentonite coated sample after testing in water.

In contrast, the composite with the Al-bentonite coating, tested in air, shows distinct non-linearity prior to the peak stress. The test was interrupted for a few specimens after the onset of non-linearity but prior to the peak stress. These specimens showed multiple-matrix cracking on the tensile side of the specimen with typical crack spacing of 0.75–1.00 mm. Most of the Al-bentonite coated samples showed a single large decrease in the stress, corresponding to fiber-failure in one of the matrix cracks. However, the specimens continued to exhibit stable deformation by steady-state propagation of a delamination crack along the beam. When tested in water, the specimens with the Al-bentonite coating displayed much greater matrix cracking, and stable deformation without fiber failure up to much larger strains. The glass, uncoated, and bentonite-coated specimens continued to fail in a manner similar to failure in air. FIG. 5 shows the tensile surface of a sample with an Al-bentonite coating after bending in water with multiple matrix cracks.

FIG. 2(b) shows an SEM micrograph of a cross section of a composite of the SiC fibers (with tungsten cores) in a glass matrix. FIG. 2(c) shows an SEM micrograph of a SiC fiber with an interfacial mullite-containing coating in a glass matrix. FIG. 2(c) clearly shows the uniformity of the coating.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

What is claimed is:

1. An improved ceramic matrix composite article comprising:
   (a) a matrix phase comprised of a ceramic material selected from the group consisting of crystalline ceramics, glass ceramics, glasses and combinations thereof; and
   (b) a fiber reinforcement phase comprised of a plurality of amorphous or crystalline inorganic fibers disposed within the matrix phase,
   wherein the improvement comprises the inorganic fibers having a mullite-containing coating on the surface of said inorganic fibers and wherein the inorganic fibers are not comprised of a mullite-precursor.

2. The article of claim 1 wherein the inorganic fibers are selected from the group consisting of silicon carbide, silicon oxycarbide, carbon, alumina, boron carbide, boron nitride, zircon, seine, silicon nitride, silicon oxynitride, titanium carbide, and titanium diboride fibers.

3. The article of claim 1 wherein the matrix phase is selected from the group consisting of borosilicate glasses, aluminosilicate glasses, lithium aluminosilicate glasses, alkaline earth aluminosilicate glasses, silicon carbide, boron nitride, silicon oxynitride, and silicon nitride.

4. The article of claim 1, wherein the fiber reinforcement phase comprises at about 30% to 80% by volume of the ceramic matrix composite article.

5. The article of claim 1 wherein the inorganic fibers are silicon carbide fibers and the matrix phase is silicon carbide.

6. A process for making a ceramic matrix composite article comprising the steps of:
   (a) modifying a smectite clay by ion-exchange in solution to provide sufficient amounts of aluminum ions in the clay;
   (b) adding a pillared smectite clay to the solution to form a suspension;
   (c) drawing an inorganic fiber through the suspension of step (b) and drying the fiber thereafter;
   (d) repeating step (c) a plurality of times until the desired amount of coating is deposited on the surface of the fiber; and
   (e) combining a plurality of coated fibers with a matrix phase comprised of a ceramic material selected from the group consisting of crystalline ceramics, glass-ceramics, glasses and combinations thereof, to form a ceramic matrix composite such that the plurality of coated fibers are disposed within the matrix phase; and
   (f) heating the ceramic matrix composite to a temperature sufficient to convert the clay coating on the fibers to a coating containing mullite and wherein the inorganic fibers are not a mullite-precursor.

7. The process of claim 6 wherein the heating temperature of step (f) is at least about 800° C.

8. The process of claim 6 wherein the soluble aluminum ions are $[Al_{13}O_4(OH)_{24}(H_2O)_{12}]^{7+}$.

9. The process of claim 6 wherein the soluble aluminum ion is $Al^{+3}$.

10. The process of claim 6 wherein the pillared smectite clay is montmorillonite.

11. The process of claim 6 further comprising removing excess salts after step (b) and before step (c).

12. The process of claim 11 wherein excess salts are removed by dialyzing the suspension of step (b).

13. The process of claim 11 wherein excess salts are removed by filtering and washing the suspension of step (b).

14. A method for coating a fiber with a mullite-containing coating, comprising the steps of:
   (a) modifying a smectite clay by ion-exchange in solution to provide sufficient amounts of aluminum ions in the clay;
   (b) adding a pillared smectite clay to the solution to form a suspension;
   (c) drawing an inorganic fiber through the suspension of step (b) and drying the fiber thereafter;
   (d) repeating step (c) a plurality of times until the desired amount of coating is deposited on the surface of the fiber; and
   (e) heating the coated fiber to a temperature sufficient to convert the clay coating to a coating containing mullite and wherein the inorganic fiber is not a mullite-precursor.

15. The process of claim 14 wherein the heating temperature of step (e) is at least about 800° C.

16. The process of claim 14 wherein the soluble aluminum ions are $[Al_{13}O_4(OH)_{24}(H_2O)_{12}]^{7+}$.

17. The process of claim 14 wherein the soluble aluminum ion is $Al^{+3}$.

18. The process of claim 14 wherein the pillared smectite clay is montmorillonite.

19. The process of claim 14 further comprising removing excess salts after step (b) and before step (c).

20. The process of claim 19 wherein excess salts are removed by dialyzing the suspension of step (b).

21. The process of claim 19 wherein excess salts are removed by filtering and washing the suspension of step (b).

22. An inorganic fiber having a mullite-containing coating made by the process of claim 14.

23. An amorphous or crystalline inorganic fiber having a mullite-containing coating wherein the inorganic fiber is not a mullite-precursor.

24. The fiber of claim 23 selected from the group consisting of silicon carbide, silicon oxycarbide, carbon, alumina, boron carbide, boron nitride, zircon, spinel, silicon nitride, silicon oxynitride, titanium carbide and titanium diboride fiber.

* * * * *